INVENTOR.
EMIL A. VOLK JR.
BY
Robert W. Ely
ATTORNEY

July 31, 1962  E. A. VOLK, JR  3,046,741
STARTING SYSTEM HAVING A GAS GENERATOR
Filed Dec. 8, 1958  4 Sheets-Sheet 3

INVENTOR.
EMIL A. VOLK JR.
BY
*Robert W. Ely*
ATTORNEY 3,046,741
STARTING SYSTEM HAVING A
GAS GENERATOR
Emil A. Volk, Jr., Hasbrouck Heights, N.J., assignor to
The Bendix Corporation, a corporation of Delaware
Filed Dec. 8, 1958, Ser. No. 778,842
2 Claims. (Cl. 60—39.46)

This invention relates to a starting method or system for jet-type aircraft engines and more particularly concerns combustion means for generating turbine-driving gases for a starter.

It is customary to provide gases for air turbine starters of turbo jet engines by having a pressurized air supply from a permanent installation at the air base or by having ground compressor carts which provide pressurized air. However, there are instances when a particular air field does not have such an installation source or such other compressor sources are inoperative. Thus, there is a need for a lightweight, reasonably-small unit which can be in reserve at an airfield or can be carried in the aircraft for emergency use or flown in or on another plane for starting the engine of an airplane which has made a landing where an air-supply for starting is not available.

An object of the present invention is to provide a novel improved gas generator which generates and conditions hot cartridge gases by pressurizing water and spraying the water into the gases.

Another object is the provision of a small lightweight gas generator which uses a solid propellant cartridge, a liquid-cooling mass-adding sprayer and a pressure regulator whereby a turbine starter or a starting rotor of a jet engine can be powered.

A further object is the provision of a small compact portable ground cart which is self-contained as to gas sources, coolant, electrical power and controls and is reliable and simple to maintain and operate.

An additional object is the provision of a gas generator in which a coolant such as water is properly added to gases from a solid propellant cartridge by an arrangement which does not require external energy.

A further object is the provision of a gas generator in which the water is sprayed into swirling cartridge gases in order to cool the gases and add mass thereto so that the resulting mixture can be used more efficiently in a turbine starter.

The accomplishment of the above objects by the present invention along with features and advantages of the invention will be apparent from the following description and the accompanying drawing in which.

Figure 1:
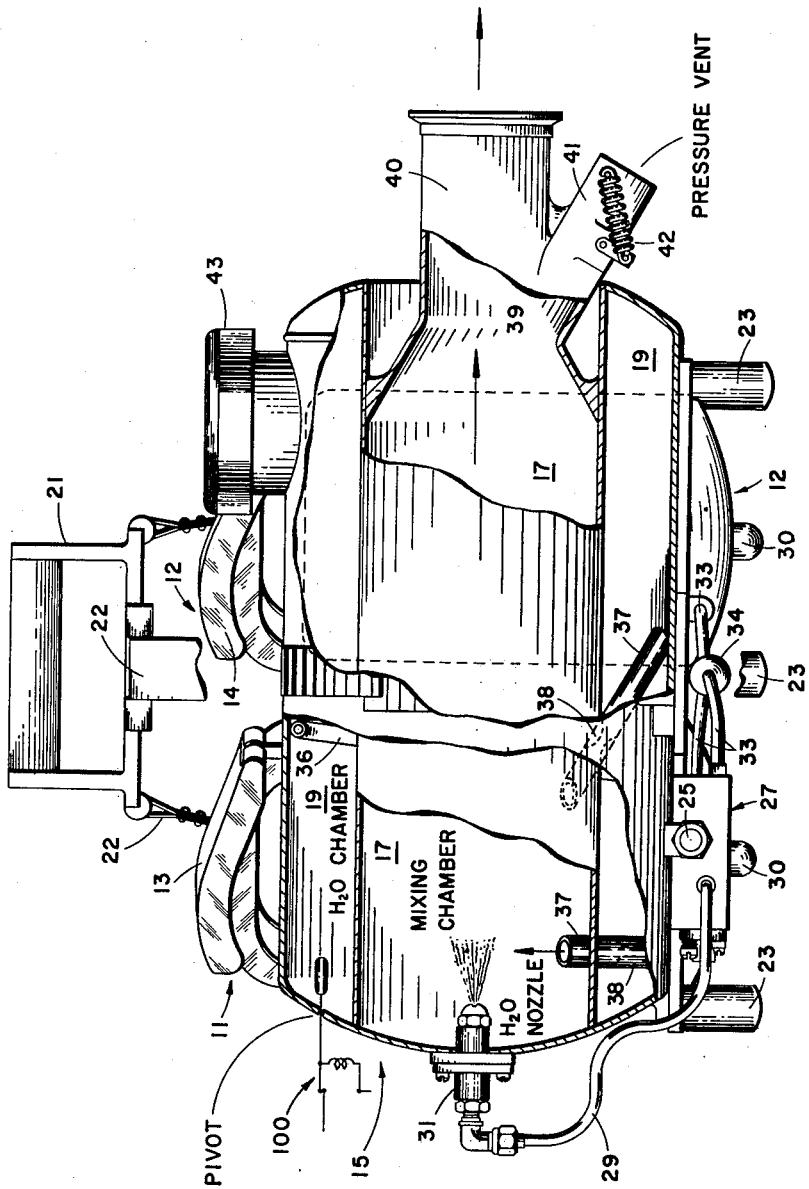
FIG. 1 is a side partially cross-sectioned view of a portable gas generator which has a cartridge breech, a water tank and a mixing chamber in which the water cools the cartridge gases.
Figure 2:
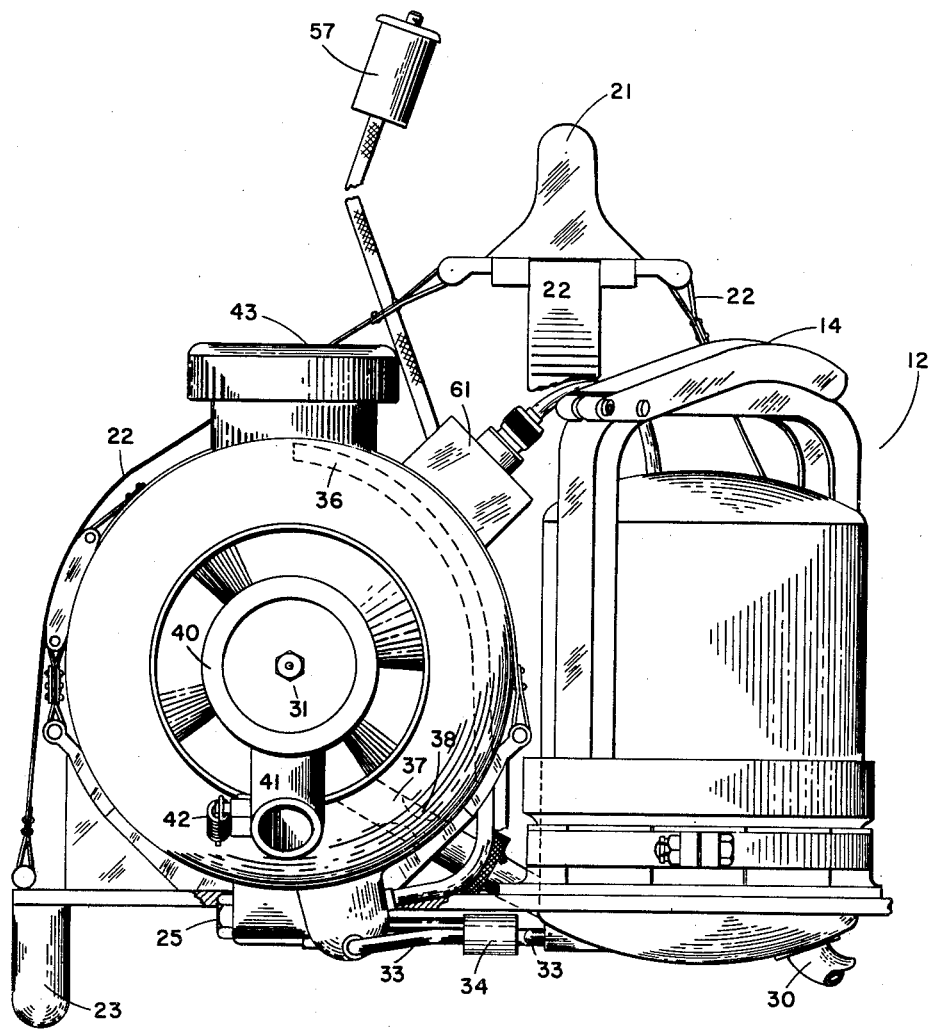
FIG. 2 is a view of the right end of the FIG. 1 generator and shows the electric starting switch.
Figure 5:
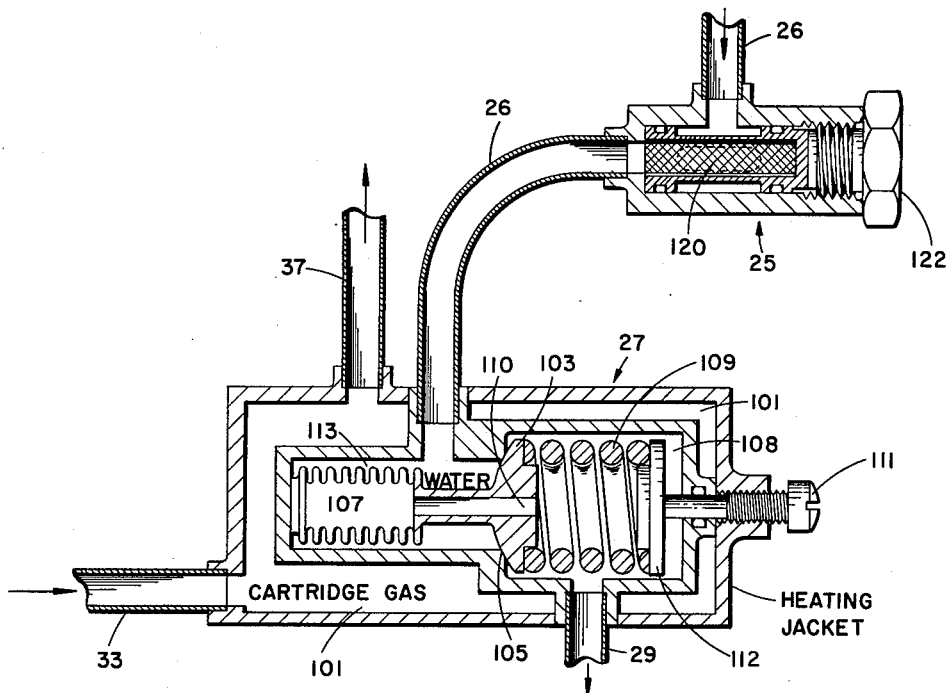
FIG. 5 is a cross-sectioned view of a heated valve adapted to regulate the water which is sprayed in the FIG. 1 embodiment.

Referring to FIGS. 1, 2 and 5, cartridge breeches 11 and 12 having grip-release handles 13 and 14 are mounted vertically back of the cylindrical body 15. Body 15 has a central tubular mixing chamber 17 which is surrounded by an annular water chamber 19. A handle 21, straps 22, and feet 23 provide the means for carrying and supporting the body, two cartridge breeches and their accessories. A flow path for water is provided by filter 25 which connects into water chamber 19 and valve 27 via tubing 26, tubing 29 and spray nozzle 31 which is axially-mounted in the left end of the mixing chamber 17.

Two flow paths are provided for the cartridge gases which are generated by ammonium nitrate in the breeches 11, 12. One path is provided by tube 33 which extends from the bottom of the breeches into a manifold 34 and then the heating jacket (not shown) around valve 27 and then through pipe 36 to the top of the water chamber. Both breeches connect into pipes 37 having restrictions 38 which direct hot gases into the chamber 17 toward and in front of the water spray nozzle 31. Each breech has a blow-out pipe 30 containing a rupturable disc. The mixing chamber 17 necks down at the throat 39 and has outlet pipe 40. At the narrow part of the throat, a pipe 41 and the spring-biased flapper-type pressure valve 42 provide means for regulating the cooled mixture of cartridge gases and steam to a predetermined pressure such as forty-five p.s.i.a. A capped water filling tube 43 empties into the water tank 19.

In FIG. 2 it can be seen that a firing switch 57 is connected to flashlight batteries 61 which have a wire connection to the breech (described below) so that the electric firing device associated with the ammonium nitrate solid propellant cartridge can be energized.

Figure 3:
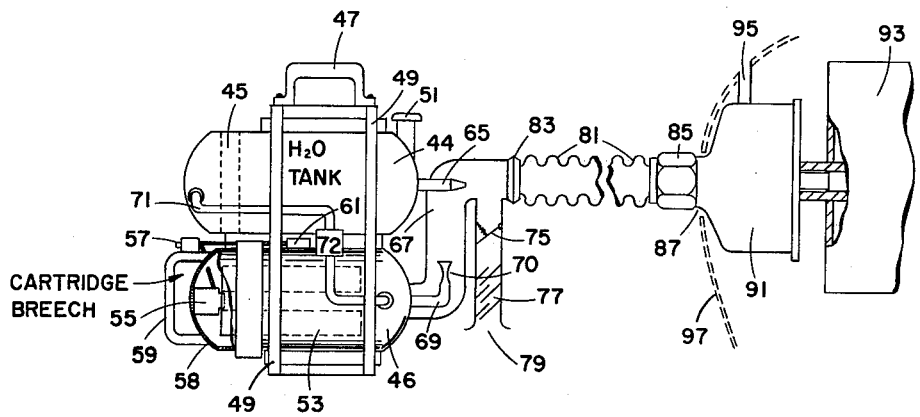
FIG. 3 is a schematic showing of an aircraft starting system which includes a different means for transferring and mixing the water with the cartridge gases and which the detachable connection between the gas generator and a turbine starter connected to a jet engine.

In FIG. 3 a different embodiment of the gas generator is shown connected in a starting system. A water tank 44 containing a piston 45 is mounted over a cartridge breech 46, both being horizontally disposed. A handle 47 and straps 49 provide the means for carrying. A capped water-filling pipe 51 permits filling of tank 41. The tubular cartridge 53 has a squib 55 which is energized when firing switch 57 is pressed. The breech 46 was armed by making an electrical connection (not shown) when the cover 58 is threaded in position by handle 59. This electrical connection provides a safety interlock showing proper connection of the cover 58. Battery 61 between the tank and breech provides the current and a pilot light (not shown) indicates when a cartridge is ignited. Water sprayer 65 projects into conduit 67 which also receives cartridge gases from breech 46 by means throated pipe 69 having restricting nozzle 70. A conduit 71 having a pressure reducing valve 72 directs pressurized gas (145 p.s.i.a.) back of the accumulator piston 45 so that water is sprayed at a predetermined rate. It is to be noted that the axis of the sprayer is perpendicular to the axis of gas nozzle 70 whereby the gas swirls about the water spray and then flows parallel to the axis of the water nozzle 65. Downstream thereof a spring-biased vent flapper valve 75 is provided and this pressure regulating valve 75 discharges into a multiplated muffler 77 which has a flared outlet 79 directed downwardly. A flexible pipe 81 is connected by a fastener 83 to conduit 67 and extends to a coupling 85 which connects to the ducting 87 for the air turbine starter 91. Starter 91 is connected to jet engine 93 and exhausts through outlet 95 which projects through the aircraft skin 97.

Figure 4:
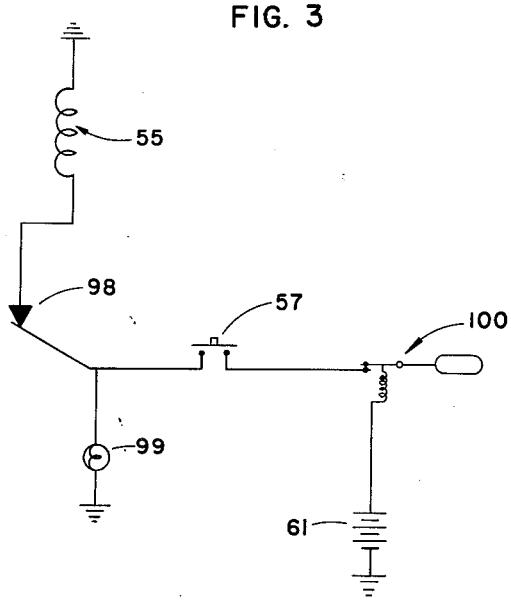
FIG. 4 is an electrical schematic adapted to fire the cartridge of the gas generator.

In FIG. 4 the above mentioned electrical circuit is diagrammed. The cartridge arming connection or electrical interlock 98 provides a circuit from firing switch 57 to the squib or igniter 55. Battery connects to firing switch and, when switch is closed the igniter fires the cartridge and warning light indicates a fired cartridge. Float switch 100 (see FIG. 1 also) prevents energization of the circuit unless there is a predetermined water level in the tank, such level being sufficient to properly condition the cartridge gases.

In FIG. 5 the water valve 27 and filter 25 of FIGS. 1 and 2 are shown in detail. Heating jacket 101 permits hot cartridge gases via tubing 33 and 37 to rid the valve of any ice particles. The valve element 103 is spring biased against valve seat 105. Bellows 107 which is responsive at high pressure to offset spring 109 is connected to chamber 108 via passage 110. Water enters tube passes through filter valve when pressurized sufficiently to overcome spring 109 and flows out through pipe 29 to the water sprayer. Screw 111 having plate 112 bearing against spring 109 permits adjustment of the valve opening pressure. Bellows 107 is positioned in recess 113. Filter 25 has a removable screen 120 and an access nut 122.

Figure 6:
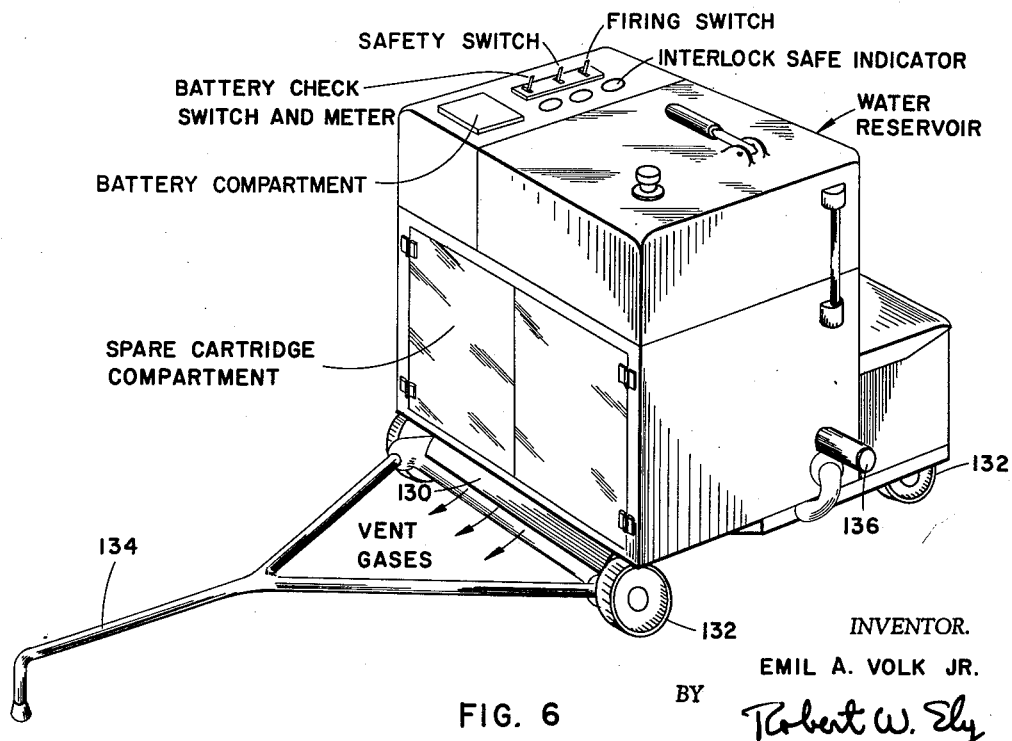
FIG. 6 is a perspective view of a cart in which a gas generator is incorporated and shows how the generator can be made portable.

In FIG. 6 which shows the wheeled ground cart, the muffler 130 is arranged horizontally under the cart inside of wheels 132 and directs vent exhaust into the triangle of the Y-shaped handle 134 so that personnel are protected. The above-mentioned flexible pipe would be connected to outlet 136. This cart has the following items (none of which is designated by numerals): a water reservoir, a spare cartridge compartment, a battery check switch, a meter, the mentioned water filler tube, batteries and firing switch. A safety switch is also legended and is merely another manual switch like the firing switch above mentioned to provide extra safety since the safety light in front of the switch will indicate an electric circuit is completed to the firing switch.

In the operation of the FIGS. 1 and 2 device, the cartridge in breeches 11 and 12 are fired and gases at 400–1200 p.s.i.a. from the breeches enter the mixing chamber 17 tangentially and rearwardly-tangentially thereby producing a swirl or turbulent flow. If the pressure exceeds 1500 p.s.i.a., the discs in blow-out pipes 30 will rupture. Gas also flows to the top of the water chamber 19 via pipe 36, pressurizing and causing water to flow through heated valve 27. This metering valve 27 has its opening varied in accordance with breech pressure, thereby providing approximately the rate of addition of cooling liquid necessary to maintain a temperature of about 390° F. or within the range of 340–440° F. at the entrance of the air turbine starter regardless of the cartridge temperature. The predetermined quantity of water and the arrangement of flows paths and burning rate of the cartridge are such that a temperature range of 340–440° F. is maintained. Water is sprayed from nozzle 31 and cools and somewhat reduces the pressure of cartridge gases. The gases are fully pressure-regulated by valve 42 to about 40–45 p.s.i.a. and then fed to the turbine starter for starting the associated jet engine.

In the operation of the FIG. 3 device, the cartridge 53 is fired and breech gases move through pressure regulating valve 72 to back of the piston 45. These gases at 145 p.s.i.a. move the piston 45 to the right and hence cause water to be sprayed from nozzle 65. Other gases (making up the main flow) move through restricted gas nozzle 70 and discharge into pipe 67. These other gases take a right angle turn at the water nozzle 70 and hence are turbulent so that they can pick up more liquid droplets and more rapidly vaporize the droplets. The vapor-gas flow which results is cooled to about 350° F. and is comprised of cartridge gases mass-augmented by vapors from the liquid. The cooled gas flow is then pressure regulated to 45 p.s.i.a. by valve 75 and then powers the turbine starter 91 and starts the jet engine 93. Valve 75 vents to muffle 77 whose outlet 79 is directed so as to not injure personnel.

The operation of the electric controls for two gas generators and the valve 27 is believed apparent from FIGS. 4 and 5 in view of the above description.

The FIG. 5 cart having storage permits successive starting of more than one engine or one single engine aircraft and provides means for checking the battery and electrical circuit. It is to be noted that the vent muffler discharges between the handle so that personnel are protected.

One ammonium nitrate cartridge weighing about eight pounds and six pounds of water or water plus 40–50% by weight alcohol will start a J–75 engine. Two eight-pound cartridges and proportionally more water-alcohol will start larger engines. One twelve pound cartridge if standardized and readily-available would be adequate for all current engines.

It is to be understood that persons skilled in the art can make changes in the disclosed embodiments without departing from the invention set forth in the appended claims.

What is claimed is:

1. A small, self-contained gas generator comprising tubular means providing a cylindrical horizontally-arranged mixing chamber and annular liquid tank surrounding said mixing chamber, said mixing chamber having an end wall and opposite therefrom a reduced-diameter outlet pipe, a capped filling tube extending from the top of said annular liquid tank, a spray nozzle mounted in said end wall and arranged to spray axially into said mixing chamber, a vertically-arranged cartridge breech, support structure having said tubular means and said cartridge breech mounted thereon and including a carrying handle, liquid passage means connecting the bottom of said annular tank to said spray nozzle, pressurizing means connecting the bottom of said cartridge breech to the top of said annular liquid tank for gas pressurizing of liquid in said tank, said liquid passage means including a valve responsive to the pressure of liquid in said tank for varying the liquid passed to said spray nozzle, gas passage means connected from the bottom of said cartridge breech to said mixing chamber, said gas passage means including a flow restriction and being constructed to introduce gases at the location of said spray nozzle toward and around said spray nozzle for better mixing and cooling, an atmospheric vent pipe connected to the bottom of said outlet pipe, said vent pipe having a pressure regulating device responsive to the pressure in said outlet pipe for maintaining a predetermined pressure by venting, said gas passage means being constructed to pass gases in heat exchange relation with said valve, an electrical control for firing a cartridge in said cartridge breech including a battery mounted on said tubular means and a firing switch, said liquid tank and said electrical control including a liquid-level switch for preventing firing of a cartridge if the liquid tank is not filled to a predetermined level.

2. A small, self-contained gas generator comprising a solid propellant cartridge breech, an electrical control for firing a cartridge in said breech, gas passage means connected to said breech, said gas passage means including a flow restriction, and a mixing zone in communication with said passage means, a liquid tank having a capped filling tube, support structure having a carrying handle, said support structure supporting said breech, said gas passage means and said tank, a spray nozzle connected to said tank and located in said mixing zone of said gas passage means, said electrical control including a battery and a firing switch, said gas passage means at the location of said spray nozzle being constructed and arranged to move breech gases around and toward said spray nozzle for better mixing and cooling, pressurizing means for directing breech gases to said liquid tank for the expulsion of water therefrom to said spray nozzle, said mixing zone of said gas passage means being a cylindrical chamber having said spray nozzle at one end and a reduced-diameter outlet at the outer end, said liquid tank being an annular chamber surrounding said mixing chamber, a pressure regulating device connected into said outlet and arranged to vent to atmosphere, said liquid tank being connected to said nozzle by conduit means including a valve responsive to the liquid pressure in the annular chamber for varying the liquid passed to said mixing chamber whereby the resulting temperature of the cooled gas in the mixing zone is directly proportional to the pressure and hence temperature in the breech.

References Cited in the file of this patent

UNITED STATES PATENTS

| | | |
|---|---|---|
| 1,324,607 | Maclean | Dec. 9, 1919 |
| 2,154,572 | Lansing | Apr. 18, 1939 |
| 2,578,443 | Nardone | Dec. 11, 1951 |
| 2,695,365 | McLean | Nov. 23, 1954 |
| 2,709,335 | Van Vactor | May 31, 1955 |
| 2,723,528 | Stark et al. | Nov. 15, 1955 |

FOREIGN PATENTS

| | | |
|---|---|---|
| 736 | Great Britain | Aug. 15, 1882 |
| 477,022 | France | June 24, 1915 |
| 670,309 | Great Britain | Apr. 16, 1952 |
| 1,116,831 | France | Feb. 13, 1956 |